United States Patent [19]

Groen, Jr.

[11] 4,197,018

[45] Apr. 8, 1980

[54] MIXER

[75] Inventor: Fred H. Groen, Jr., River Forest, Ill.

[73] Assignee: Groen Division - Dover Corporation, Elk Grove Village, Ill.

[21] Appl. No.: 1,904

[22] Filed: Jan. 8, 1979

[51] Int. Cl.² .............................................. B01F 7/00
[52] U.S. Cl. ..................................... 366/248; 99/348; 366/309
[58] Field of Search ............... 366/244, 245, 247, 248, 366/309, 312, 313, 310; 99/348, 323.5; 308/DIG. 8

[56] References Cited

U.S. PATENT DOCUMENTS

| | | | |
|---|---|---|---|
| 1,776,691 | 9/1930 | Johnson | 366/248 |
| 2,946,299 | 7/1960 | Clifford | 366/248 |
| 3,311,354 | 3/1967 | Wilson | 366/248 |
| 4,010,934 | 3/1977 | McCord | 366/247 |
| 4,049,243 | 9/1977 | Kramer | 366/248 |
| 4,057,226 | 11/1977 | Mos | 366/244 |
| 4,065,811 | 12/1977 | Pauty | 366/325 |

Primary Examiner—Robert W. Jenkins
Attorney, Agent, or Firm—Jakala, Knechtel, Valentino, Demuer & Dallas

[57] ABSTRACT

A mixer comprising a shaft which is appropriately curved to substantially conform to the interior shape of the sides and bottom walls of a steam kettle and a structure for supporting the shaft within the steam kettle. The latter consists of a lid which fits about the peripheral upper edge of the steam kettle. A length of a heat resistant, self lubricating, tubular material, such as Teflon, is slidably extended over substantially the entire length of the shaft, to perform a dual function. This material, first of all, eliminates the need for any type of bearing structure which normally would be required in order for the shaft to be rotated when disposed to extend through the lid, into the steam kettle. The material itself functions as a bearing. Secondly, the material being heat resistant can seat on the bottom of the steam kettle and thereby permit the shaft to be easily and properly seated in the steam kettle without the need for other mechanical devices. This material also functions to wipe or scrape the product from the walls of the steam kettle, while preventing the shaft from directly contacting the metal surfaces of the steam kettle, so that the product is constantly or continuously wiped from the walls of the steam kettle and there is no metal-to-metal contact between the shaft and the steam kettle during stirring or mixing. A stirring blade is attached to the shaft in a fashion such that it is easily removed for cleaning. The shaft is easily rotated by a handle affixed to its upper terminal end.

9 Claims, 7 Drawing Figures

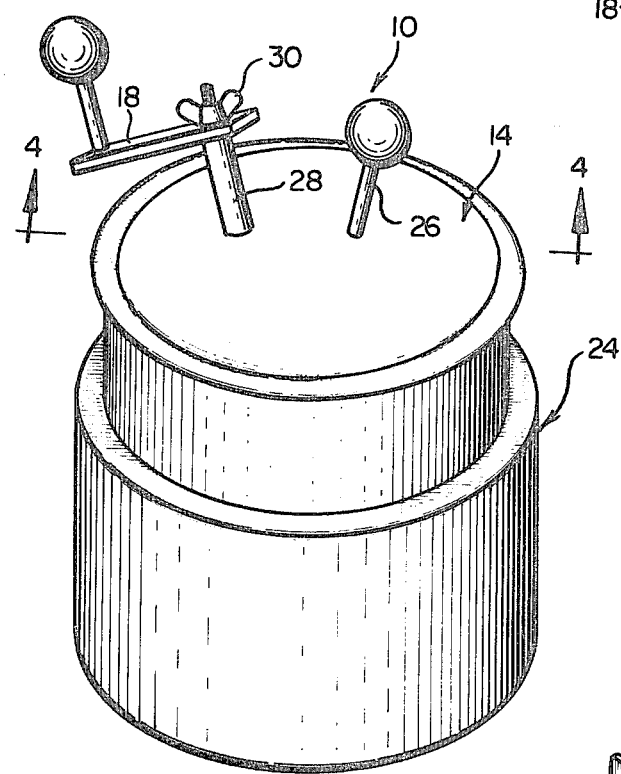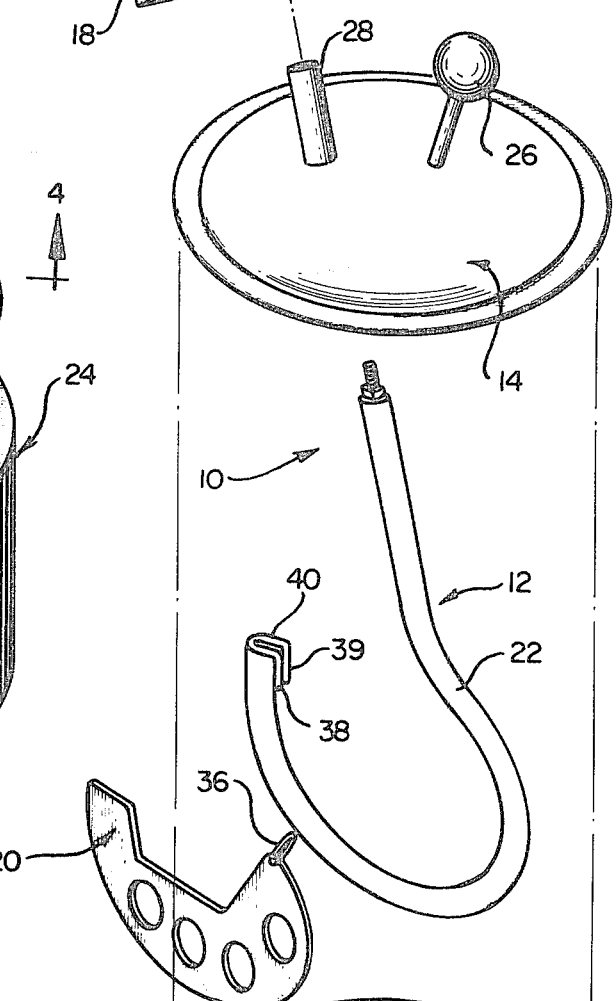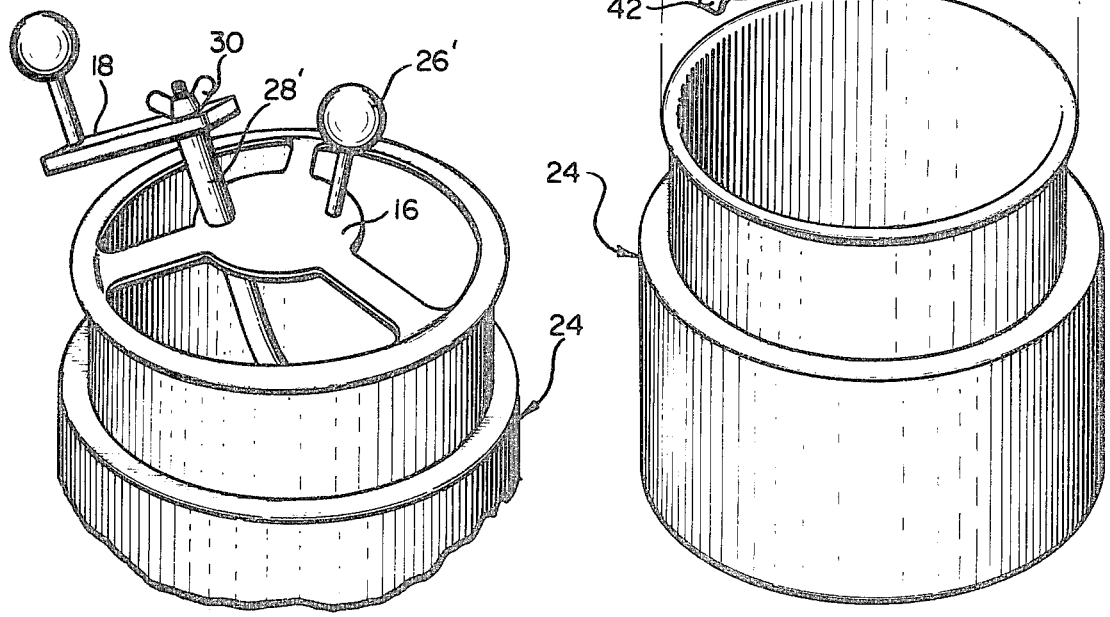

MIXER

This invention relates to an improved mixer. More particularly, it relates to an improved inexpensive mixer which is easily and quickly affixed to or detached from a mixing vessel, such as a steam kettle or the like and which not only mixes or stirs a product therein but further functions to wipe the product from the walls of the mixing vessel to prevent the product from burning on the walls. More particularly still, it relates to a mixer of the described type which is of a simple construction such that it may be easily dis-assembled for cleaning and subsequently re-assembled for use, and such that no bearing assemblies are required.

There presently are various different mixers which are commercially available, including many which are constructed for industrial as opposed to household uses. The mixer of the present invention is primarily intended for use in an industrial application, however, there is no reason for so limiting its use. The mixer, however, is particularly useful and finds its greatest utility in, for example, industrial type applications in commercial kitchens, restaurants, and fast food operations where certain foods must be stirred or mixed periodically. As indicated above, there presently are mixers specifically designed for use in these recited environments. These mixers, however, are generally relatively complex mechanical assemblies, and are correspondingly expensive. In addition, the use of the mixer is sometimes restricted.

The mixer of the present invention, as well as its utility, can be better understood and appreciated by referring to a particular application of it, and the problem it solved. In particular, the mixer evolved as a solution to a problem which existed and which required that a food product be maintained at a precise established temperature, plus or minus 1°-2°, and be periodically stirred or mixed. In addition, the food product had to be wiped from the walls of the heating vessel so that it would not set up on and subsequently burn on the walls. The food product was retained in a steam kettle, and its temperature could be maintained as required. However, the steam kettle contained a lid and, each time the lid was removed to periodically stir or mix the food product, its temperature would drop far below acceptable values. Obviously, a possible solution to such a problem would be to attach one of the presently available commercial mixers to the steam kettle and operate it to continuously stir or mix the food product. While such a solution may have been practical, it was not economically feasible, for in most cases the cost of the mixer exceeds the cost of the steam kettle, thus the cost becomes prohibitive. Further still, since the steam kettle and the mixer are utilized with a food product, both required frequent cleaning for sanitary reasons and particularly to comply with local health codes. The resulting complexity of the assembly discouraged frequent cleaning, because of the difficulties encountered in dis-assembling and re-assembling it. A much simpler solution, therefore, was required.

From this, the mixer of the present invention evolved and comprises a shaft which is appropriately curved to substantially conform to the interior shape of the sides and bottom walls of a steam kettle and a structure for supporting the shaft within the steam kettle. In this particular application, the latter consisted of a lid which fit about the peripheral upper edge of the steam kettle. A length of a heat resistant, self lubricating, tubular material, such as TEFLON, is slidably extended over substantially the entire length of the shaft, to perform a dual function. This material, first of all, eliminated the need for any type of bearing structure which normally would be required in order for the shaft to be rotated when disposed to extend through the lid, into the steam kettle. The material itself functions as a bearing. Secondly, the material being heat resistant can seat on the bottom of the steam kettle and thereby permit the shaft to be easily and properly seated in the steam kettle without the need for other mechanical devices. This material also functions to wipe or scrape the product from the walls of the steam kettle, while preventing the shaft from directly contacting the metal surfaces of the steam kettle, so that the product is constantly or continuously wiped from the walls of the steam kettle and there is no metal-to-metal contact between the shaft and the steam kettle during stirring or mixing. Further still, this material is generally impervious to the food product so that there is little if any danger of contamination of the food product by the latter being absorbed by the material. The material can be easily cleaned by simply washing and reusing it, while it is retained on the shaft. Alternatively, it can be easily removed from the shaft for cleaning, simply by slipping it off of the shaft. A stirring blade is attached to the shaft in a fashion such that it is easily removed for cleaning. This stirring blade can assume any one of a number of different shapes, depending upon the particular applications for the mixer. The shaft is easily rotated by a handle affixed to its upper terminal end.

As stated above, the structure for supporting the shaft in the particularly described application is a lid for the steam kettle. In other applications, however, other means, such as, for example, a spider assembly which bridges the top of the steam kettle can be used. Also, the shaft can be affixed at an established angle within the lid and steam kettle, so that the food product is both lifted and stirred simultaneously. The degree to which the food product is lifted during stirring and mixing can be varied, simply by providing means on the support for the shaft which permits the shaft to be selectively and fixedly secured at any desired angle within the support and steam kettle. While the shaft simply has a handle affixed to its end for manually rotating it, obviously motor means can be provided to accomplish this task.

Accordingly, it is an object of the present invention to provide an improved mixer.

Other objects of the invention will in part be obvious and will in part appear hereinafter.

The invention accordingly comprises the features of construction, combination of elements, and arrangements of parts set forth, and the scope of the invention will be indicated in the claims.

DESCRIPTION OF THE DRAWINGS

For a fuller understanding of the nature and objects of the invention, reference should be had to the following detailed description taken in connection with the accompanying drawings, in which:

FIG. 1 is a perspective view illustrating a mixer exemplary of the invention affixed to a steam kettle;

FIG. 2 is an exploded perspective view of the mixer and the steam kettle;

FIG. 3 is a partial perspective view illustrating the mixer having a spider assembly for supporting the shaft thereof, the same being affixed to a steam kettle;

DESCRIPTION OF PREFERRED EMBODIMENT

Figure 4:
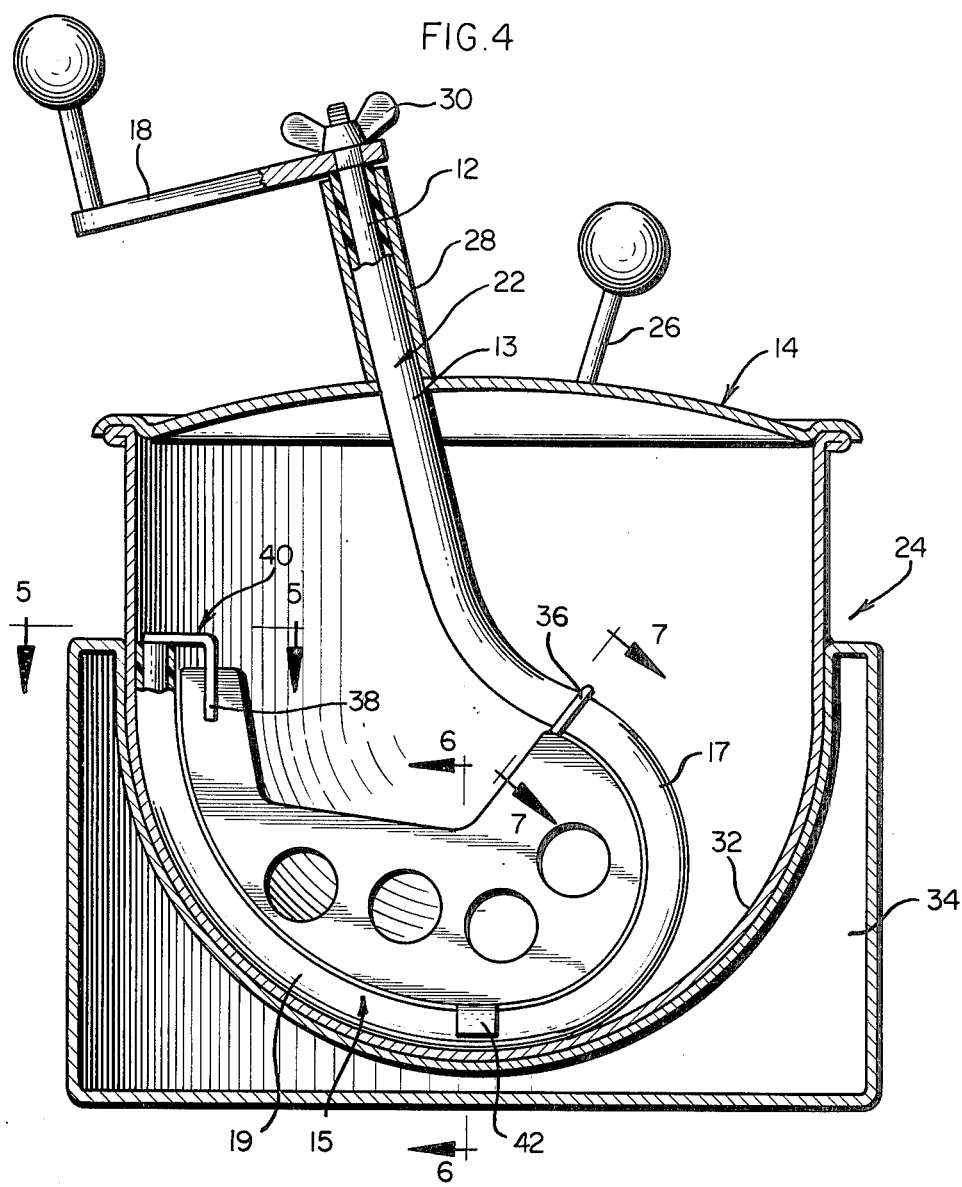
FIG. 4 is a sectional view of a steam kettle, illustrating the mixer of the invention therein.

Referring now to the drawings, the improved mixer 10 of the present invention can be seen to include a shaft 12, a support structure for the shaft 12 which can be, for example, a lid 14 (FIG. 2), a spider-assembly 16 (FIG. 3) or other similar arrangement which is capable of supporting the shaft 12 in the manner hereinafter described, a handle 18, a stirring blade 20 and a covering 22 for the shaft 12 which preferably and advantageously is of a heat-resistant, self-lubricating material, such as TEFLON. The mixer 10 is illustrated in use with a steam kettle 24, for mixing or stirring a product within the steam kettle. As indicated above, the mixer 10 evolved from the need for a mixer which could be used to periodically stir or mix a food product while retained within a heating vessel and maintained therein at an established temperature.

More particularly, as can be best seen in FIG. 4, the lid 14 closes the top opening of the steam kettle 24 and has a handle 26 on it for supporting the lid while rotating the shaft 12. The lid 14, in addition, has a short length of tubular material welded or otherwise affixed to it which forms a shaft support 28 for the shaft 12. The shaft support 28, as indicated, is of a tubular material and the lid 14 has an aperture in it which is aligned with the longitudinal axis of the shaft support 28. With reference to FIG. 3, it may be noted that the spider assembly 16 is of generally the same construction, having a shaft support 28' and a handle 26'.

The shaft 12 of the mixer 10 extends through the shaft support 28 into the steam kettle 24. As indicated above, the shaft 12 has a covering 22 of a heat-resistant, self-lubricating material on it, over substantially its entire length. The covering 22 preferably is an extended length of tubular material which can be slidably extended onto the shaft 12. The shaft support 28 is proportioned with respect to the shaft 12 and its covering 22 such that the shaft and the covering are snugly but yet rotatably and removably retained therein. In this respect, the covering 22 provides an important feature of the mixer 10, in that it permits a relatively low-cost mixer to be provided, by eliminating the need for any bearing assemblies to rotatably support the shaft 12 in the lid 14. The covering 22 effectively functions as a bearing for the shaft 12 and, in addition, it prevents a metal-to-metal contact between the shaft 12 and the interior of the steam kettle 24 and wipes the product from the side and bottom walls of the steam kettle 24 to prevent the product from burning on the walls. As indicated above, the covering 22 preferably is of TEFLON, however, other materials having similar heat-resistant, self-lubricating properties can be used as well, so long as those materials will not contaminate food products in the steam kettle 24.

The shaft 12 has a straight portion 13 at its upper end which extends through the shaft support 28, and its upper terminal end is adapted to receive thereon the handle 18 for rotating it. In the illustrated embodiment, the handle 18 and the end of the shaft 12 are simply formed with complimentary key elements (not shown) so that the handle will not rotate on the shaft, and the end of the shaft 12 is threaded to receive a wing nut 30 for securing the handle on the shaft.

The straight portion 13 of the shaft 12 extends into the steam kettle 24, to a point substantially corresponding to the center of the steam kettle. The straight portion 13 then merges with an arcuately curved portion 15 which is just curved outwardly, as at 12, from the center of the steam kettle in a semi-circularly fashion. The radius of this curved portion 17 generally corresponds to approximately ¼ of the depth of the steam kettle, and this curved portion 17 flows into and merges with the curved end portion 19 of the shaft 12, such that the arcuately curved portion 15 of the shaft 12, from a point substantially corresponding with the bottom center of the steam kettle, engages the interior wall 32 of the steam kettle along substantially its entire length. In this respect, it may be noted that this curved end portion 19 of the shaft 12 has a curvature corresponding to the radius of the bottom wall of the steam kettle, and is of a length to extend to a point substantially corresponding to the termination of the steam chamber 34 about the steam kettle 24. Accordingly, as the shaft 12 is rotated, the product is wiped from the bottom and side walls of the steam kettle 24 and is thereby prevented from burning on the walls.

It may be further noted that the shaft support 28 and the shaft 12 are disposed such that the shaft 12 extends into the steam kettle 24, at an angle of approximately 10°, as illustrated. With this construction and shape of the shaft 12, the product within the steam kettle 24 will not only be mixed or stirred when the shaft 12 is rotated, it will also be lifted from the bottom and sides of the steam kettle such that it is effectively "folded-in" with the remainder of the food product. The degree to which the food product is lifted can be controlled by varying the angle at which the shaft 12 extends into the steam kettle 24. Accordingly, this angle is variable and, if desired, the shaft support 28 can be modified such that it is movable to vary the angle at which the shaft 12 extends into the steam kettle, so that different degrees of lift can be provided.

The stirring blade 20 is a generally semi-circular shaped member which is of a flat sheet material such as metal, plastic or the like, and which generally corresponds in shape to the accurately curved portion 15 of the end of the shaft 12. The ultimate shape of the stirring blade 20 is not particularly relevant. It is only necessary that the stirring blade 20 provide sufficient surface area to stir or mix the product in the steam kettle 24, and be of a shape or construction to be easily removably affixed to the shaft 12. In the illustrated embodiment, the stirring blade 20 is removably affixed to the shaft by means of a loop 36 affixed to the stirring blade 20, and a pair of spaced-apart depending legs 38 and 39 of a bracket 40 secured to the end of the shaft 12. As can be best seen in FIGS. 2 and 5, this bracket 40 is generally a U-shaped member having a portion of its two arms bent downwardly to form the depending legs 39 and 40. Another generally U-shaped in cross-section bracket 42 is secured to the lower edge of the stirring blade 20, and is formed to seat on the covering 22 or shaft 12, as can be best seen in FIGS. 2, 4 and 6.

Figures 5, 6, 7:
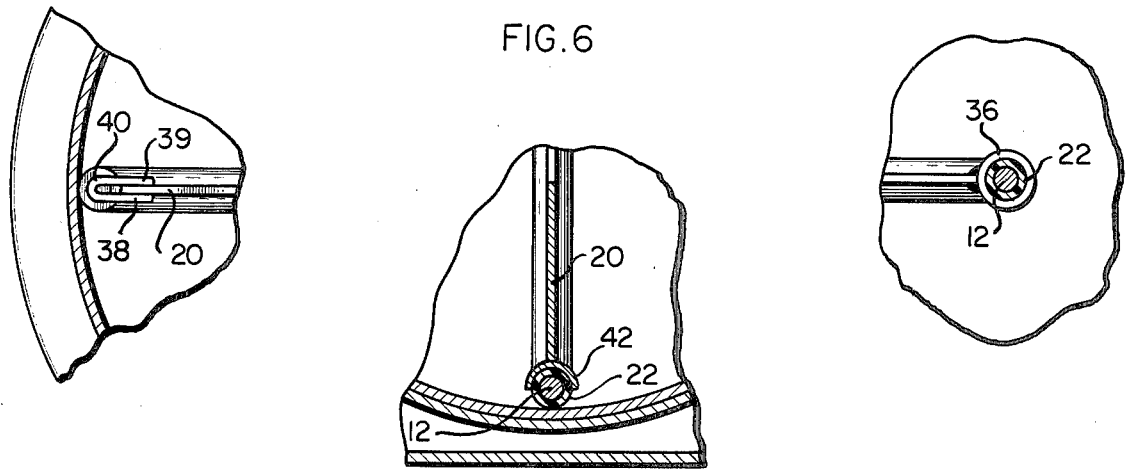
FIG. 5 is a partial sectional view taken generally along lines 5—5 of FIG. 4.
FIG. 6 is a partial sectional view taken generally along lines 6—6 of FIG. 4.
FIG. 7 is a partial sectional view taken generally along lines 7—7 of FIG. 4.

In assembling the stirring blade 20 on the shaft 12, the loop 36 is first extended about the legs 38 and 39 of the bracket 40, and then the stirring blade 20 is manipulated to slide the loop 36 along the length of the shaft 12 until it is properly positioned. The one edge of the stirring blade 20 extends and is retained between the two legs 38 and 39, as best seen in FIGS. 4 and 5, while the bracket 42 straddles and seats on the covering 22 or shaft 12. The stirring blade 22 is easily removed, simply by reversing the above procedure while a specific example is shown of means for attaching the stirring blade 22 to the shaft 12, obviously other means of attachment can as well be provided and used.

From the above description, it can be seen that a simple, economical mixer 10 is provided, for both mixing or stirring a product within a vessel, such as the steam kettle 24, and for wiping the product from the walls thereof. In addition, an important feature of the mixer 10 is that it can be easily and quickly disassembled for cleaning, a feature which is extremely important when used with food products. The entire mixer 10 is dis-assembled by first removing the stirring blade 22 from the shaft 12 in the manner described above, and by removing the handle 18 by simply removing the wing nut 30 and lifting off the handle. Thereafter, the shaft 12 with the covering 22 on it is removed from the shaft support 28 simply by pulling it out of the shaft support. The covering 22 can be removed, by slidably extending the same off of the shaft 12.

After cleaning, the mixer 10 is re-assembled, again by simply reversing the above described procedure.

Once assembled, it may be noted that the shaft 12 with its covering 22 is effectively self-seating in the steam kettle 24, since the shaft 12 is not retained in a bearing assembly or the like. The lid 14, or spider assembly 16, is simply seated on the steam kettle 24, and then the shaft 12 is merely pushed downwardly until its arcuately curved portion 15 seats on the bottom of the steam kettle 24. As illustrated, the shaft 12 is manually rotated by means of the handle 18, however, it is apparent that motor means could be affixed to the shaft for automatically and continuously rotating it, if desired.

It will thus be seen that the object set forth above, among those made apparent from the preceding description, are efficiently attained and certain changes may be made in the above construction. Accordingly, it is intended that all matter contained in the above description or shown in the accompanying drawings shall be interpreted as illustrative and not in a limiting sense.

What is claimed is:

1. An improved mixer for mixing or stirring a product within a metallic vessel such as a steam kettle, comprising, a metallic shaft;

a metallic support means for said shaft adapted to seat atop the vessel and to support said shaft so that the latter extends into the vessel;

a covering of a heat resistant, self-lubricating tubular material proportioned to be slidably and removably extended over said shaft over substantially its entire length, said covering preventing a metal-to-metal contact between said shaft and said support means and functioning as a bearing for said shaft to permit the latter to be rotated within said support means;

a stirring blade for mixing and stirring a product within the vessel removably secured to said shaft within the vessel;

said shaft having an upper end which is generally straight and a lower end which is generally arcuately shaped with at least a portion thereof being of a radius that substantially corresponds with the radius of the side and bottom wall of the vessel to permit said lower end thereof to substantially seat on the bottom wall of said vessel thereby permitting said shaft with said covering thereon to wipe the side and bottom wall of the vessel, whereby the product within the vessel is effectively wiped from the side and bottom wall of the vessel when said shaft is rotated; and means affixed to said shaft for rotating it.

2. The mixer of claim 1, wherein said shaft extends through said support means into the vessel at an established angle, whereby the product within the vessel is effectively lifted and folded together when the shaft is rotated to mix and stir the product.

3. The mixer of claim 1, wherein said support means for said shaft comprises a tubular shaft support through which the upper straightend of said shaft extends, said tubular shaft support being proportioned with respect to said shaft and said covering thereon such that said shaft with said covering thereon is snugly and rotatably received therein, said covering functioning as a bearing means for said shaft.

4. The mixer of claim 3, wherein said shaft and said covering thereon is slidably extended into and through said tubular shaft support, whereby said shaft and said covering thereon are easily removed for cleaning simply by slidably extending said shaft and said covering thereon from said tubular shaft support.

5. The mixer of claim 1, wherein said stirring blade is of a flat sheet material and is of a generally semi-circular shape.

6. The mixer of claim 5, wherein the end of said shaft disposed within the vessel has a pair of spaced-apart legs affixed thereto for receiving therebetween said stirring blade for removably securing one edge thereof to said shaft said stirring blade having along an opposite edge thereof a loop secured to it proportioned to receive therethrough said shaft, and a bracket which is U-shaped in cross-section and proportioned to seat on said shaft along a lower edge thereof, said stirring blade being removably received to said shaft by extending the end of said shaft through said loop and then manipulating said stirring blade along the length of said shaft until the end of said stirring blade can be slidably disposed between said spaced-apart pair of legs, with said bracket seated on said shaft.

7. The mixer of claim 1, wherein said support means for said shaft comprises a lid for closing the top of said vessel.

8. The mixer of claim 1, wherein said support means for said shaft comprises a spider assembly adapted to be affixed to the top of said vessel.

9. The mixer of claim 1, wherein said means for rotating said shaft comprises a handle removably affixed thereto.

* * * * *